United States Patent

Kitani

[11] Patent Number: 5,835,803
[45] Date of Patent: Nov. 10, 1998

[54] CAMERA

[75] Inventor: Kazunari Kitani, Kawasaki, Japan

[73] Assignee: Canon Kabushiki Kaisha, Tokyo, Japan

[21] Appl. No.: 880,182

[22] Filed: Jun. 20, 1997

Related U.S. Application Data

[63] Continuation of Ser. No. 787,147, Jan. 22, 1997, abandoned.

[30] Foreign Application Priority Data

Jan. 31, 1996 [JP] Japan .................................... 8-015606

[51] Int. Cl.$^6$ ...................................................... G03B 1/00
[52] U.S. Cl. ........................................... 396/409; 396/410
[58] Field of Search ................................... 396/404, 405, 396/409, 410

[56] References Cited

U.S. PATENT DOCUMENTS

| | | | |
|---|---|---|---|
| 4,304,480 | 12/1981 | Fukahori et al. ........................ | 396/409 |
| 4,494,842 | 1/1985 | Kimura et al. .......................... | 396/410 |
| 4,540,261 | 9/1985 | Matsumoto et al. ..................... | 396/410 |
| 4,671,636 | 6/1987 | Desormeaux ............................ | 396/407 |
| 5,077,568 | 12/1991 | Maruyama ............................... | 396/410 |
| 5,300,975 | 4/1994 | Kunishige ............................... | 396/410 |
| 5,506,648 | 4/1996 | Kazami et al. .......................... | 396/409 |

*Primary Examiner*—Russell E. Adams
*Attorney, Agent, or Firm*—Robin, Blecker & Daley

[57] ABSTRACT

A camera adapted to use a film in which two perforations are respectively formed at both end positions of each picture plane, comprises a winding device which winds the film, first and second perforation detecting devices which are respectively disposed adjacent to both end positions of a portion corresponding to a picture plane size, and a determination device which, while the winding device is performing a winding action of the film, determines that the film is in a stopped state, if none of the perforations is detected by the second perforation detecting device until the lapse of a first predetermined period of time after one of the perforations has been detected by the first perforation detecting device, and if none of the perforations is detected by the first perforation detecting device until the lapse of a second predetermined period of time after one of the perforations has been detected by the second perforation detecting device.

20 Claims, 12 Drawing Sheets

CAMERA

This is a continuation application under 37 CFR 1.62 of prior application Ser. No. 08/787,147, filed Jan. 22, 1997 now abandoned.

BACKGROUND OF THE INVENTION

1. Field of the Invention

This invention relates to a camera having a film transport means.

2. Description of Related Art

In conventional cameras, a film rewinding action is made to start in response to the completion of exposure of all frames of film, the number of which is read from a DX code recorded on the surface of a film cartridge, or a film rewinding action is made to start in response to the determination that film is in a stretched and stopped state when the transport of film by a predetermined amount can not take place even after a predetermined period of time has elapsed after the commencement of energization for film winding.

Further, in the case of a camera using a film which has an end perforation indicative of the completion of winding all frames of film, a film rewinding action is made to start in response to the detection of the end perforation.

However, in the above-mentioned conventional cameras, in cases where the number of frames of film is erroneously detected (read) or where the actual number of frames is less than the number of frames indicated on the film cartridge (for example, in the event of cutting the film halfway), a film transport motor would continue a driving action with the film kept in a stretched and stopped state. In such a case, the film might come off the film cartridge, thereby hindering a film rewinding action, or an excessive heat might be generated by a continuous flow of current to the film transport motor or, in the worst case, a gear train of a film transport system might be broken.

In addition, in a known method disclosed in, for example, U.S. Pat. No. 4,673,272, the amount of rotation of a gear which is in mesh with the perforations of film is detected not only to find the amount of transport per every one frame (every picture plane) but also to find a stretched and stopped state of the film due to the completion of winding all frames of the film.

Meanwhile, a camera system using a novel type of film (IX 240 film) has appeared in recent years. In such an IX 240 film, only two perforations are formed for each frame of the film. The inventor of this invention has conducted a study for finding whether a stretched and stopped state of film can be detected by using the perforation detecting method, as in the conventional cameras, even in the novel type of film.

BRIEF SUMMARY OF THE INVENTION

In accordance with one aspect of this invention, in a camera using a type of film in which two perforations are respectively formed at both end positions of each frame (picture plane), at least two lengths of time are set as a determination time used to determine a stretched and stopped state of the film by detecting perforations, so that a time interval required until the completion of the determination of the stretched and stopped state can be shortened.

The above and other aspects and features of this invention will become apparent from the following detailed description of an embodiment thereof taken in connection with the accompanying drawings.

DETAILED DESCRIPTION OF THE INVENTION

A preferred embodiment of this invention is described below with reference to drawings.

To begin with, a type of film to be used in the embodiment of this invention is described.

Figure 11:
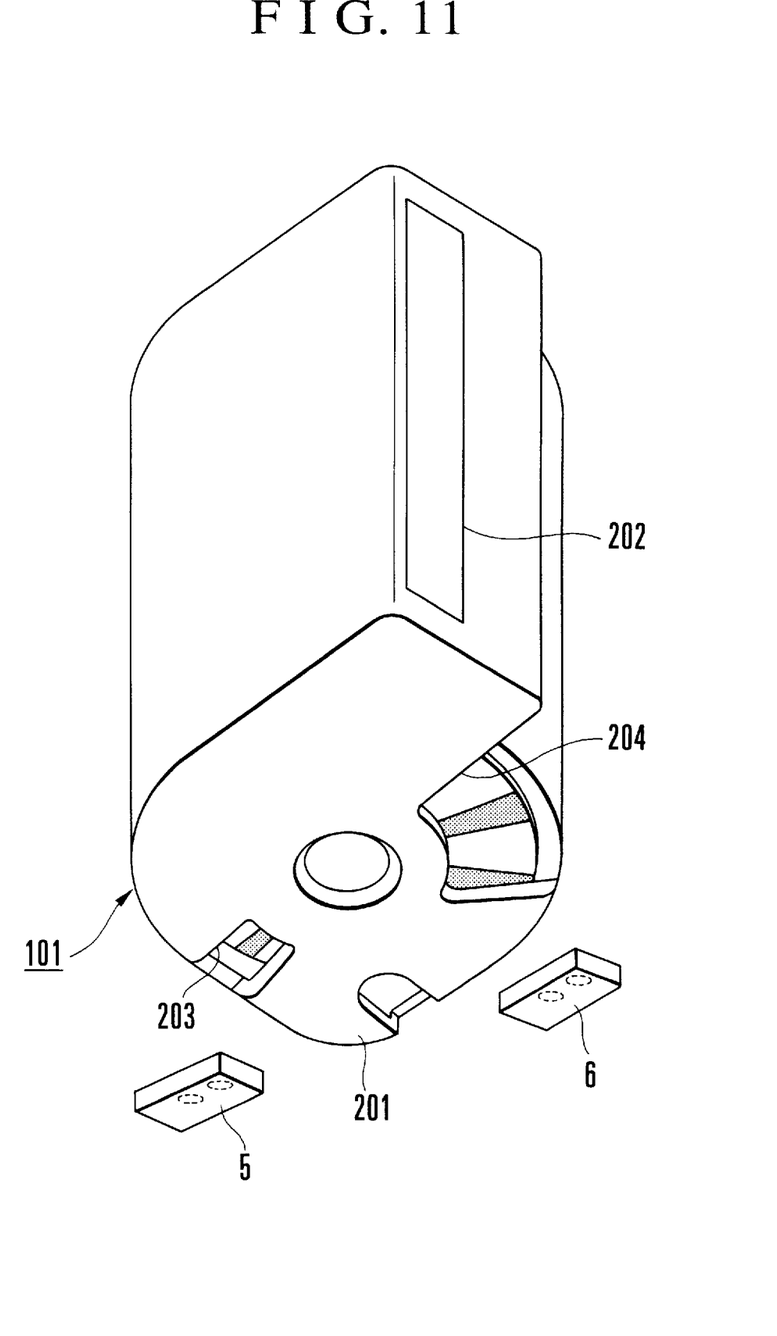
FIG. 11 is a perspective view of a film cartridge to be used in the embodiment.

FIG. 11 shows in a perspective view a film cartridge of the type to be used in the embodiment. This film cartridge 101 is of the same type as the type shown, for example, in U.S. Pat. No. 5,347,334.

Referring to FIG. 11, the illustration includes a case 201, a film pull-out port 202 and bar code reading windows 203 and 204.

Figure 12:
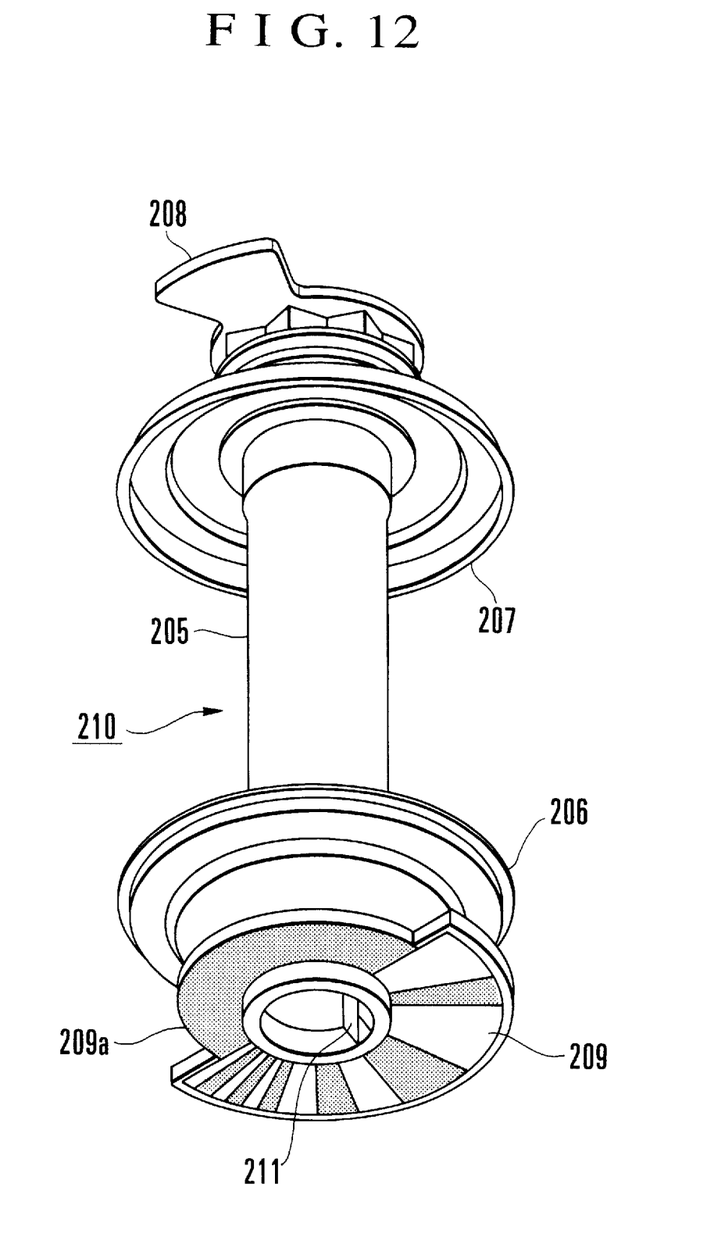
FIG. 12 is a perspective view of the internal structure of the film cartridge to be used in the embodiment.

FIG. 12 shows in a perspective view the internal structural arrangement of the film cartridge 101. A film winding shaft 205 is integrally provided with flanges 206 and 207, a flag 208 arranged as an indication member to make an indication of a state of use (hereinafter will be referred to as VEI indication), and a bar code disk (data disk) 209 which is a recording member having information such as a number of frames and an ISO film sensitivity value of the film recorded thereon. These parts jointly form a film spool 210.

A film stowing space (not shown) is formed within the film cartridge 101 between the case 201 and the film spool 210. Reference numeral 211 denotes a fork engaging part.

Referring back to FIG. 11, a first photo-reflector 5 and a second photo-reflector 6 are arranged respectively in positions corresponding to the bar code reading windows 203 and 204 to read bar codes by projecting and receiving light on and from the bar code disk 209 which rotates together with the film spool 210. The bar code disk (data disk) 209 is provided with a cutout part 209a. No signal is outputted from a part of a bar code pattern corresponding to the cutout part 209a.

Figure 13:
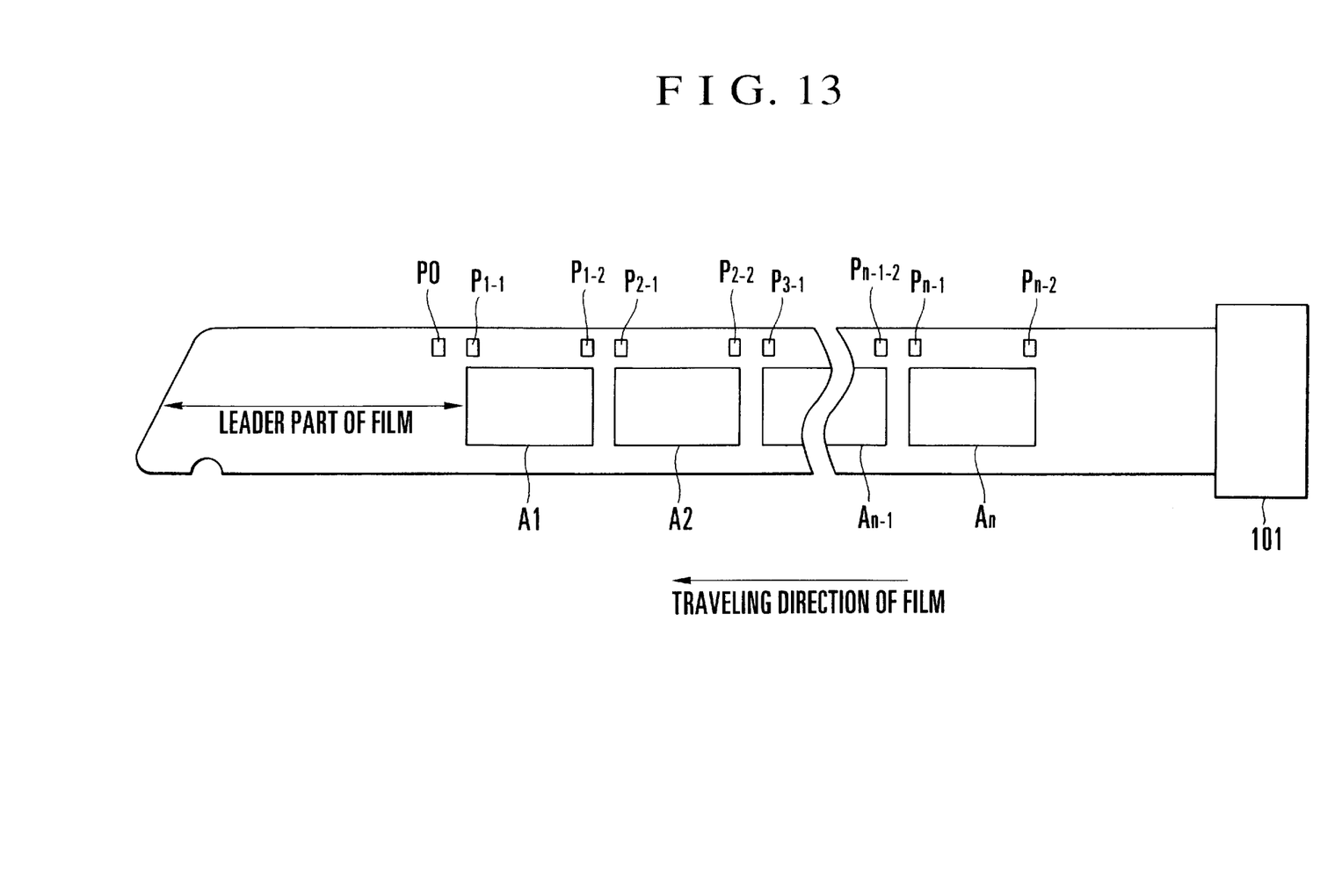
FIG. 13 is an explanatory diagram showing the positions of perforations of the film to be used in the embodiment.

FIG. 13 shows perforations P of a film contained in the film cartridge 101 in relation to each of frames (picture planes). Two perforations P are respectively formed at both ends of each frame A. In a film having a maximum number of "n" photographable frames, the perforations are provided from a first frame A1 of the film through the last frame An of the film with the perforations Pn-1 and Pn-2 formed for the last frame An. No perforation is formed in a leader part of the film which precedes the first frame.

Figure 1:
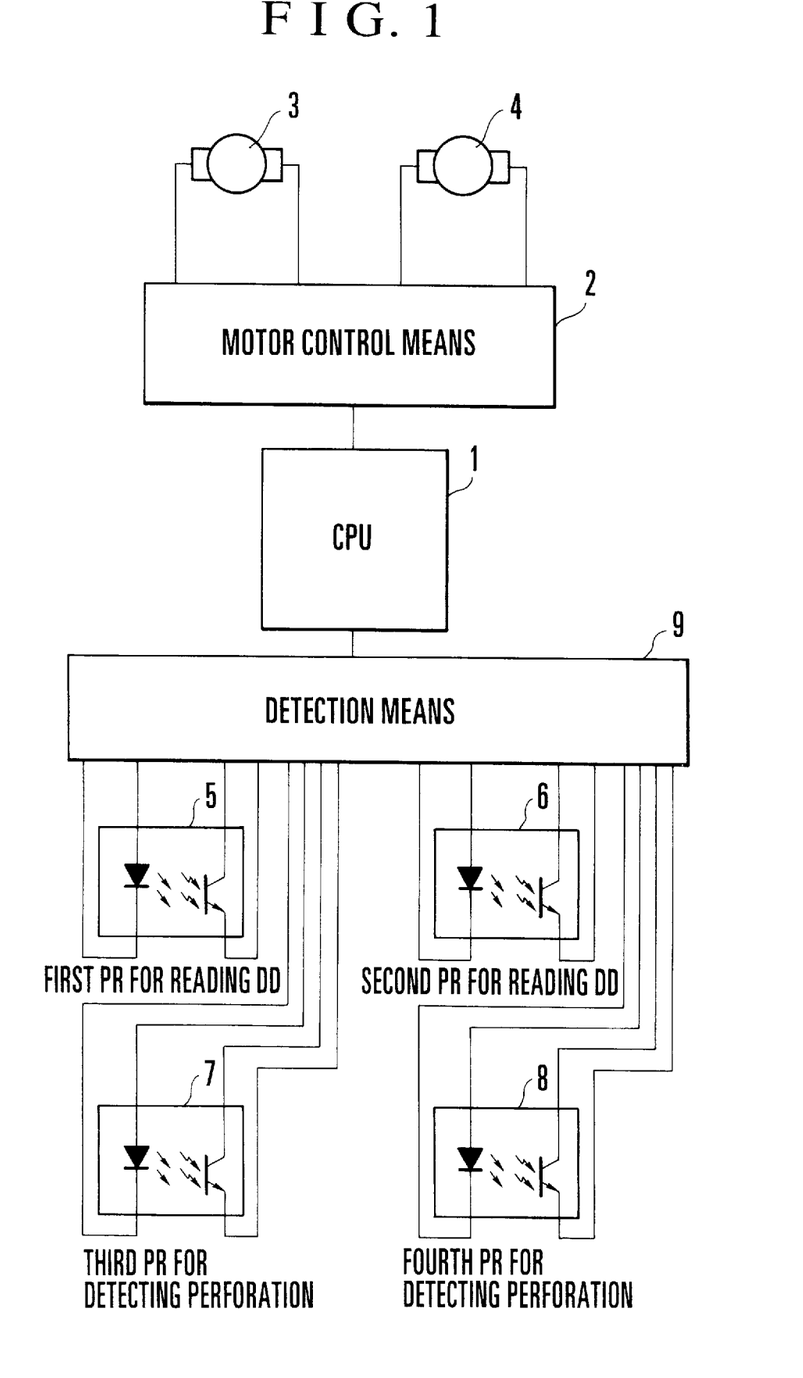
FIG. 1 is a block diagram showing a circuit arrangement of an embodiment of this invention.

FIG. 1 is a block diagram showing the arrangement of a camera according to the embodiment of this invention.

Referring to FIG. 1, a CPU 1 controls the whole camera. Motor control means 2 controls motors. A first motor 3 is arranged to drive the film spool 210 of the film cartridge 101 in such a way as to cause the data disk (bar code disk) 209 to rotate and to thrust and rewind the film from and into the film cartridge 101. A second motor 4 is arranged to cause a film take-up spool of the camera to rotate for winding the film. A first photo-reflector (photo-reflector being hereinafter abbreviated to PR) 5 is arranged to read information (bar codes) recorded on the data disk 209 which is arranged to have information on the number of frames and the ISO sensitivity value of the film recorded thereon and to rotate together with the film spool 210. The first PR 5 is composed of a light projecting element and a light receiving element. A second PR 6 is also arranged to read information recorded on the data disk 209 which rotates together with the film spool 210, and is composed of a light projecting element and a light receiving element. A third PR 7 is provided for detection of perforations of the film and is composed of a light projecting element and a light receiving element. A fourth PR 8 is provided also for detecting the perforations of the film and is composed of a light projecting element and a light receiving element. Detecting means 9 is arranged to perform four different detecting actions by controlling the PRs 5 to 8.

An action of counting wound-up film frames through the perforations detected by the detecting means 9 is programmed at the CPU 1. The last frame of the film can be found by comparing the number of frames wound up with the number of frames read from the data disk 209.

Operation of the circuit arrangement shown in FIG. 1 is described in the following.

When the camera is loaded with the film cartridge 101, the first motor 3 makes a normal rotation to cause the data disk 209 to rotate. Then, information recorded on the data disk 209 is read out by the first and second PRs 5 and 6. At this time, a maximum number of photographable frames of the film is read out. After the data is read out in a normal manner, the first motor 3 is caused to make a reverse rotation to thrust the film from the film cartridge 101. At the same time, the film perforation detecting PRs 7 and 8 are caused to detect a film transporting state. With the film perforations detected by the PRs 7 and 8, the rotation of the second motor 4 is brought to a stop when the first frame of the film reaches a predetermined position. The CPU 1 then waits for the use of the first frame for photographing. The picture plane of the first frame is obtained when the perforation P1-1 shown in FIG. 13 is detected by the PR 8. The positions of the PRs 7 and 8 will be more clearly understood with reference to FIG. 2.

The following describes a case where the film is wound up in a normal manner after a shot is taken.

Figure 2:
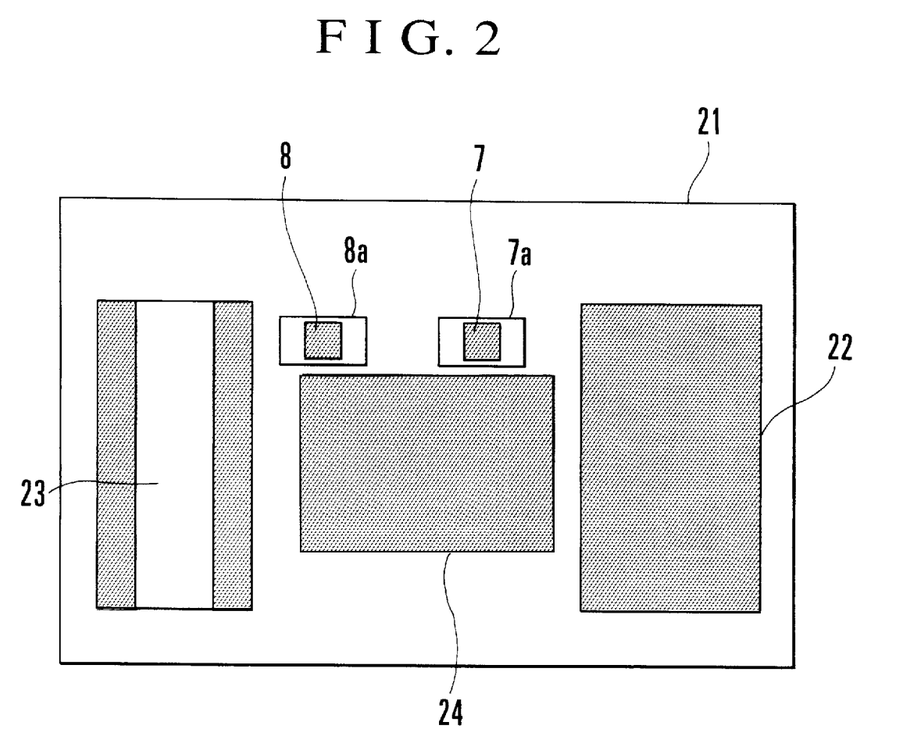
FIG. 2 schematically shows a mechanism arranged in the embodiment of this invention.

FIG. 2 is a front view of the camera showing the positions of the film perforation detecting PRs 7 and 8. The illustration includes an external appearance 21 of the camera body, a cartridge stowing chamber 22, a film take-up spool 23, an aperture 24, the third PR 7, and the fourth PR 8. Each of the PRs 7 and 8 has a reflection plate 7a or 8a disposed on the opposite side thereof across the film. Each of the PRs 7 and 8 is arranged to detect a "bright" state when a perforation of the film comes to the position of the PR 7 or 8, and to detect a "dark" state when the surface of the film comes to the position of the PR 7 or 8. At the time of film winding, the film is transported from the right side of the camera to the left side, as viewed in FIG. 2.

The fourth PR 8 is disposed at the left end of the aperture 24 and serves to detect the stopping position of the film. Specifically, if the film is transported in a correct manner, the fourth PR 8 detects a "bright" state when the film comes to a photographable position, as shown in FIG. 3.

The third PR 7 is disposed more inward than the right end of the aperture 24 and detects a "dark" state when the film comes to the photographable position.

If the film is correctly set in a certain picture plane position, the film is stopped in such a position that a perforation 32b is located at the position of the fourth PR 8, and a detection result provided by the PR 8 is a "bright" state. On the other hand, on the third PR 7, the surface of the film is located, so that a detection result provided by the PR 7 is a "dark" state.

Figure 3:
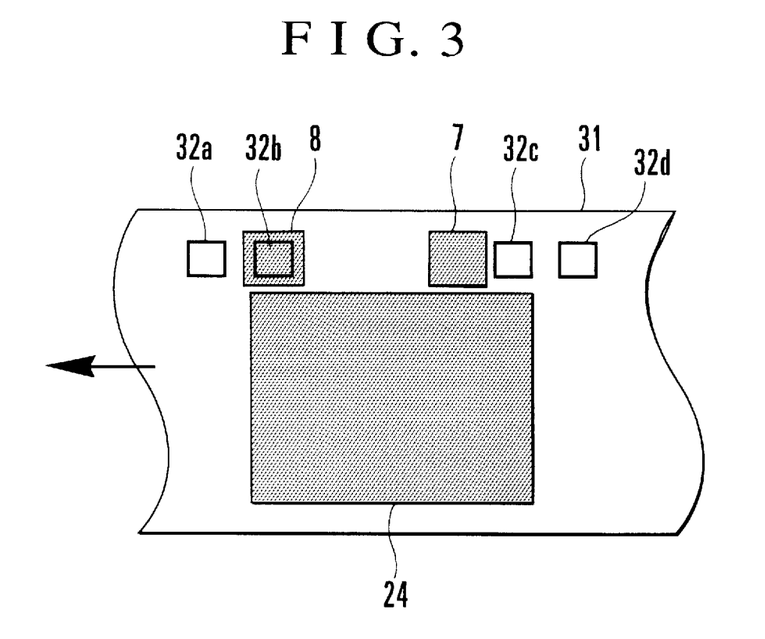
FIG. 3 shows a positional relation of a camera to a film obtained in the embodiment of this invention.

Next, a case where the film is to be wound up to the next frame position after the completion of use of one frame for photographing under the condition as shown in FIG. 3 is described.

Figure 4:
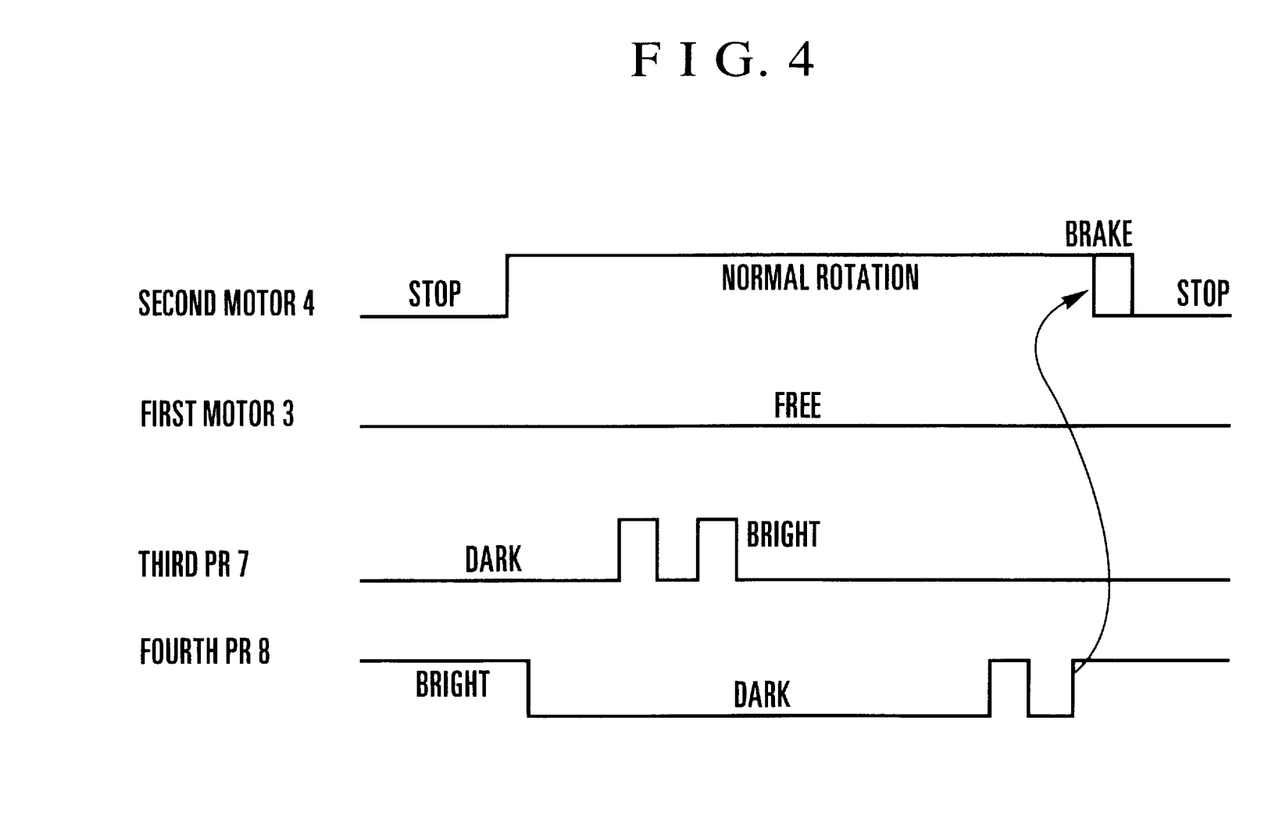
FIG. 4 is a timing chart showing control.

When the film is moved by the film winding action from the right to the left, first, the perforation 32b moves away from the position of the fourth PR 8, so that the detection output of the fourth PR 8 comes to indicate the "dark" state. Next, other perforations 32c and 32d pass the position of the third PR 7, so that the detection output of the third PR 7 comes to indicate the "bright" state twice. Subsequently, a perforation 32c passes the position of the fourth PR 8, so that the detection output of the fourth PR 8 comes to indicate the "bright" state once. After that, when the perforation 32d reaches the position of the fourth PR 8 and the detection output of the fourth PR 8 comes to indicate the "bright" state, a brake is applied to the film winding motor 4 to stop the film winding motor 4. As a result, the film is brought to a stop, and a normal one-frame winding action comes to an end. FIG. 4 shows in a timing chart the details of the process of the one-frame film winding action described above.

Figure 5:
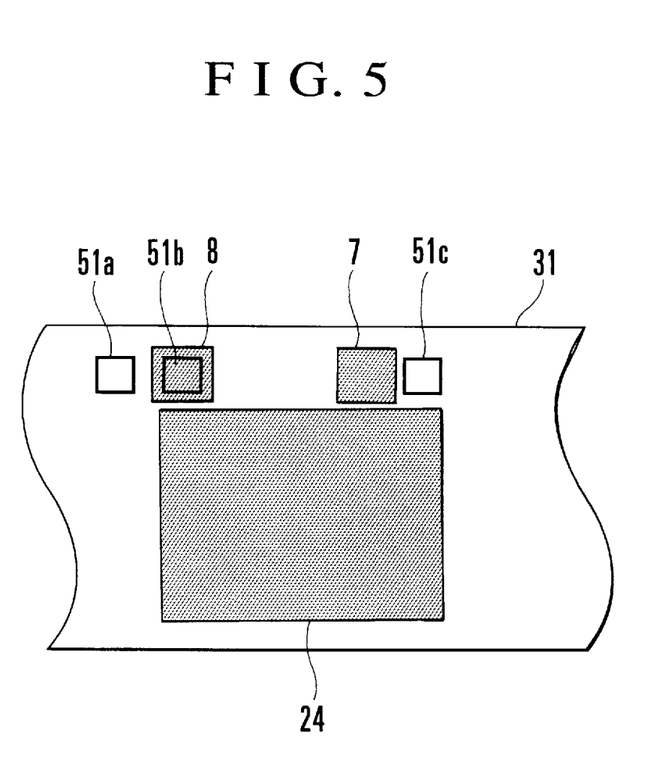
FIG. 5 shows a positional relation between a film and a camera.
Figure 6:
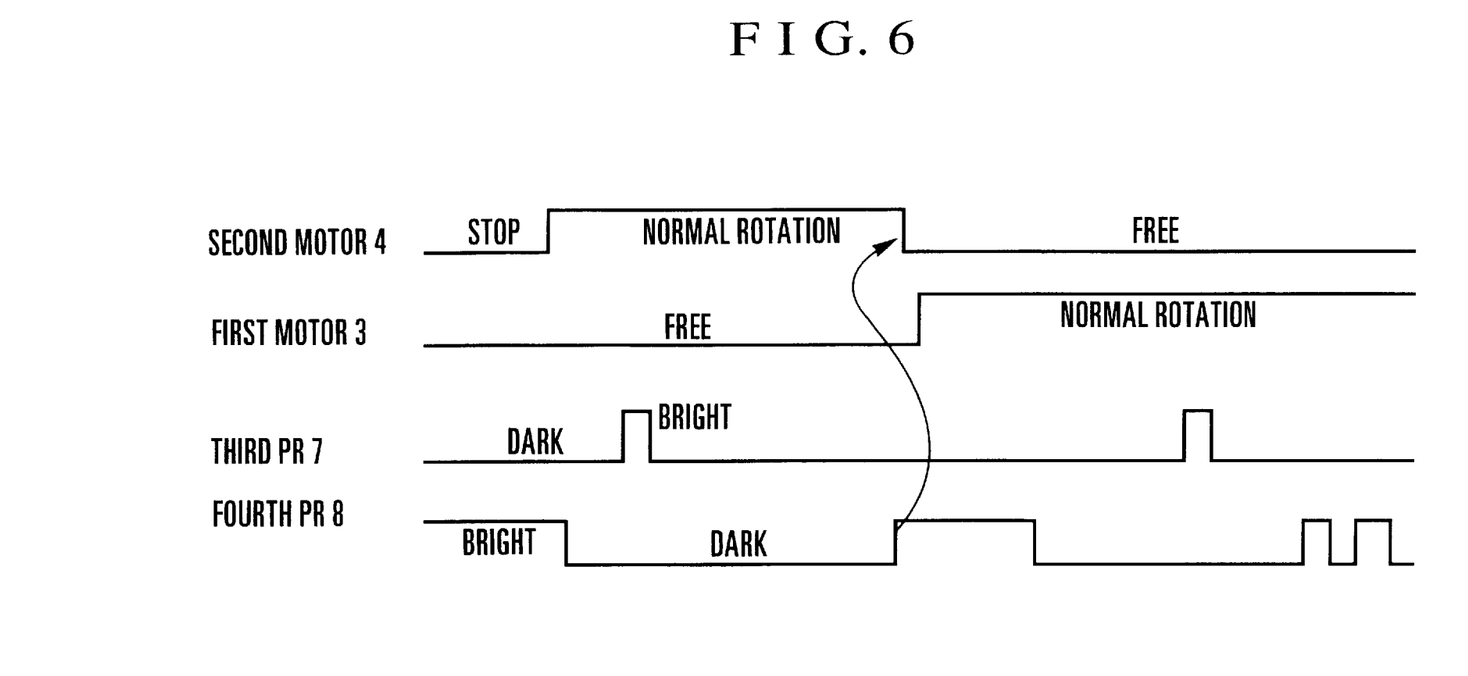
FIG. 6 is a timing chart showing control.

A film winding action to be performed after the completion of photographing on the last frame is next described as follows. The relation of the aperture 24 to the film perforations obtained in this case is shown in FIG. 5. Referring to FIG. 5, the last frame is provided with no film perforation corresponding to the perforation 32d shown in FIG. 3. When the film moves from the right to the left, first, a perforation 51b moves away from the position of the fourth PR 8, so that the detection output of the fourth PR 8 comes to indicate the "dark" state. Next, a perforation 51c passes the position of the third PR 7, so that the detection output of the third PR 7 comes to indicate the "bright" state once. After that, when the perforation 51c reaches the position of the fourth PR 8 and the detection output of the fourth PR 8 comes to indicate the "bright" state, the current film frame is judged to be the last frame, as the detection output of the fourth PR 8 thus comes to indicate the "bright" state before the detection output of the third PR 7 indicates the "bright" state twice. Then, the rotation of the second motor 4 is stopped from rotating to set the second motor 4 into a free state. The first motor 3 is then driven to make a normal rotation to rewind the film. FIG. 6 shows in a timing chart the above-described manner of transition from the last-frame winding action to the film rewinding action.

Operation to be performed in cases of abnormalities is next described as follows.

Figure 10:
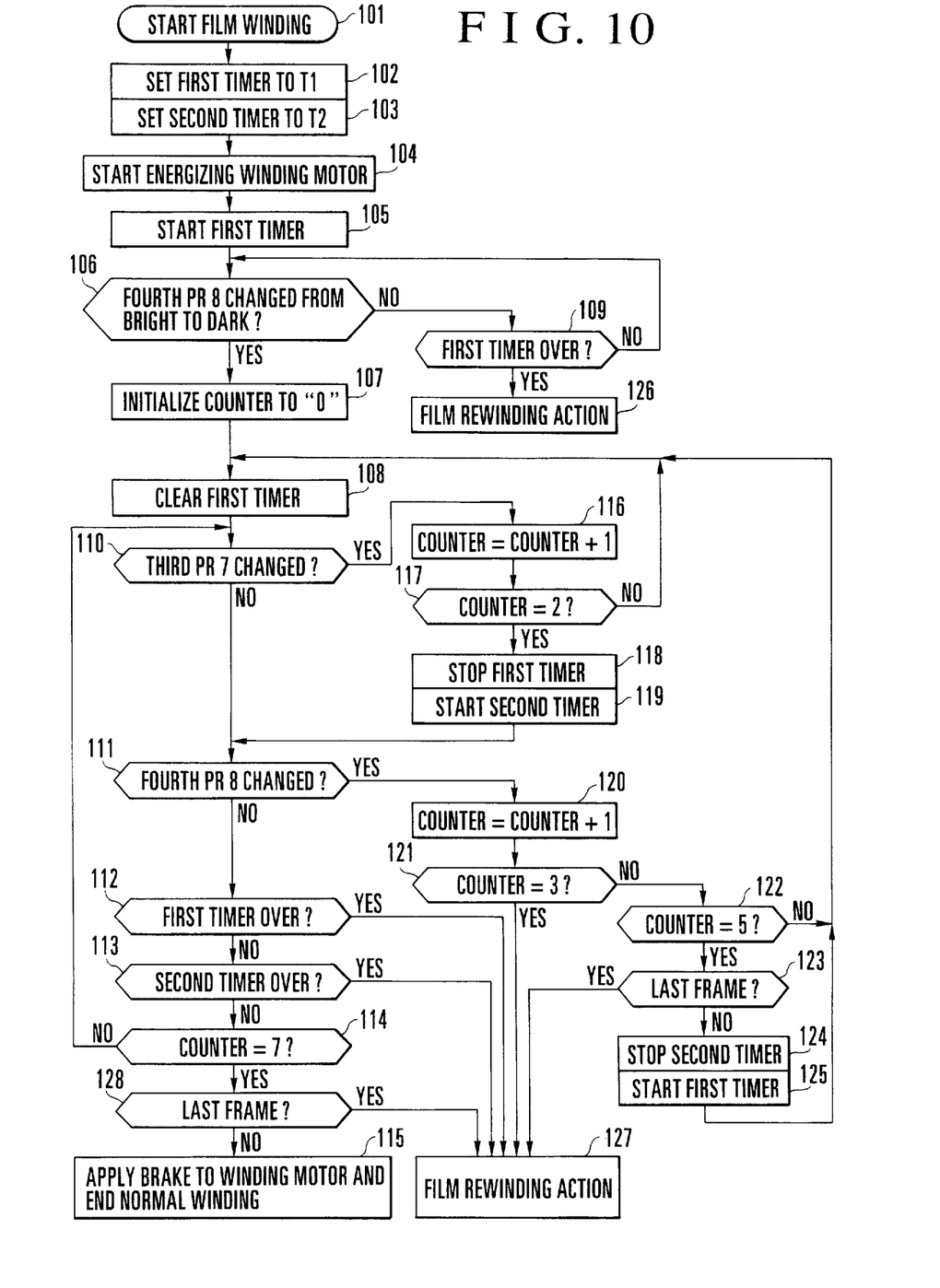
FIG. 10 is a flow chart showing the operation of the circuit arrangement shown in FIG. 1.

The CPU 1 is programmed to operate according to procedures set forth as shown in a flow chart in FIG. 10.

The flow of operation shown in FIG. 10 is programmed in view of the possibility of a case where a film comes to its end showing a stretched and stopped state while film winding is in process before arrival at the position of the last of a number of photographable frames recorded on the data disk 209 of the film cartridge 101. Such an abnormality takes place either due to an error made in reading information from the data disk 209 or in a case where the film contained in the film cartridge is actually in an abnormal state.

At a step 101, the camera begins to perform film winding in a normal manner.

More specifically, after the completion of photography, at a step 102, a first timer is set to a first value T1. At a step 103, a second timer is set to a second value T2. At a step 104, the second motor which is provided for winding the film is caused to make a normal rotation. At a step 105, the first timer is caused to start its action.

At a step 106, a check is made to find if the detection output of the fourth PR 8 has changed from the "bright" state to the "dark" state. If not, the flow of operation proceeds to a step 109. At the step 109, a check is made for an overflow (end of time count) of the first timer. If the first timer is not overflowing, the flow of operation returns to the step 106. If the first timer is found to be overflowing, the flow of operation proceeds to a step 126 to perform a film rewinding action.

If, at the step 106, the detection output of the fourth PR 8 is found to have changed from the "bright" state to the "dark" state after the commencement of energization of the film winding motor 4, the flow of operation proceeds to a step 107. At the step 107, a counter is initialized to "0". At a step 108, the first timer is cleared. At a step 110, a check is made for a change in the detection output of the third PR 7. At a step 111, a check is made for a change in the detection output of the fourth PR 8. If no change is found in the detection outputs of both the third and fourth PRs 7 and 8, the flow proceeds to a step 112. At the step 112, the first timer is checked for its overflow (end of time count). At a step 113, the second timer is checked for its overflow. If both the first and second timers are found to be not overflowing, the flow of operation proceeds to a step 114 to make a check for the count value of the counter. Since the count value of the counter is "0" at this point of time, the flow returns to the step 110 to repeat the steps 110 through 114.

Figure 7:
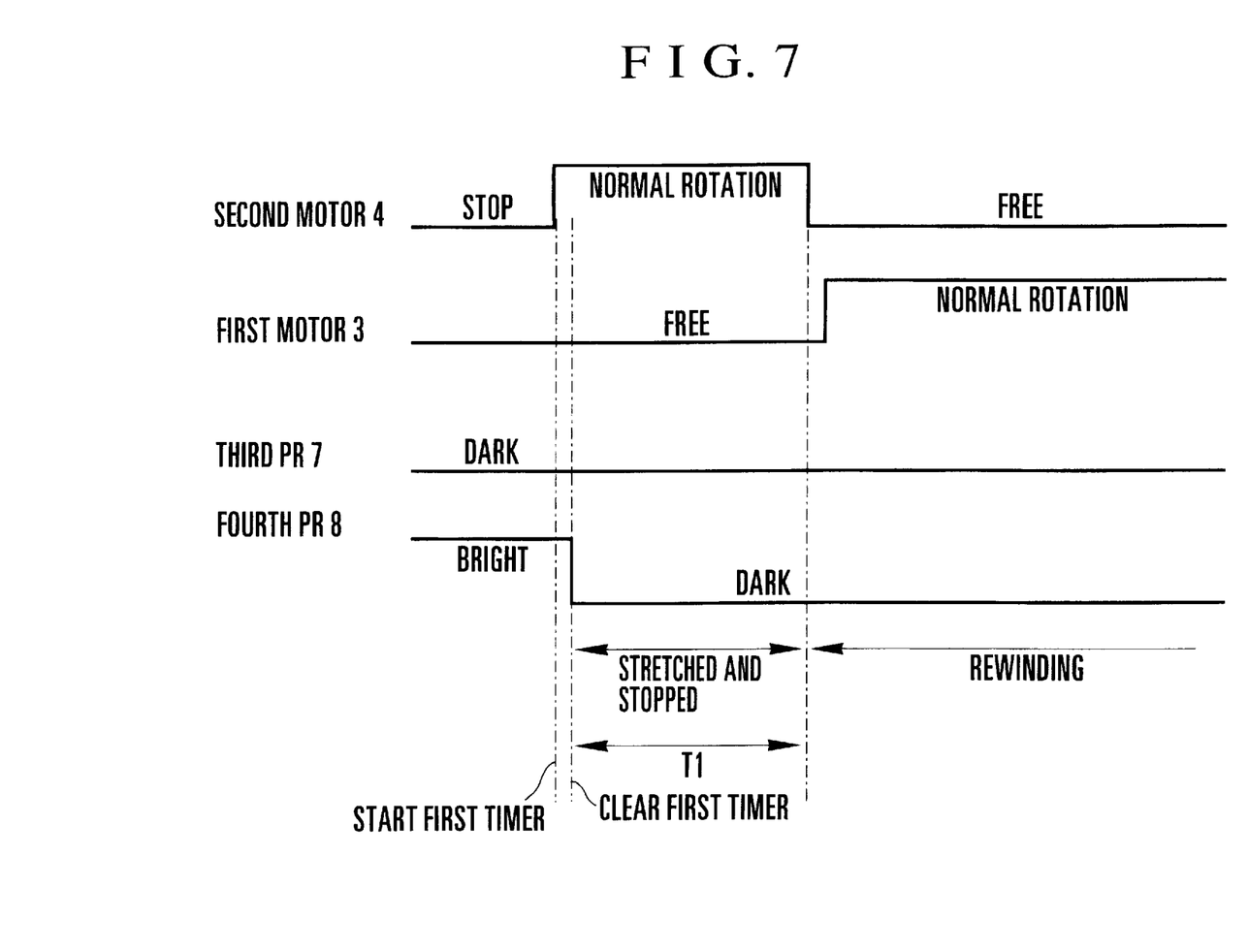
FIG. 7 is a timing chart showing control.

If the film happens to stretch to be no longer movable under the above-stated condition, no change takes place in the detection outputs of the third and fourth PRs 7 and 8. Then, the time count by the first timer which has already been started comes to overflow reaching the first value T1. If this state of overflow is detected at the step 112, the film is judged to be in a stretched and stopped state, and the flow of operation proceeds to a step 127. At the step 127, the first motor 3 is caused to make a normal rotation for a film rewinding action. In this instance, the state of energizing the motors 3 and 4 in relation to the detection outputs (signals) of the PRs 7 and 8 is as shown in FIG. 7.

If the film is wound to cause a change in the detection output of the third PR 7 while the steps 110 to 114 are repeated, the flow of operation is executed as follows. When the change of the detection output of the third PR 7 is found at the step 110, the flow of operation proceeds to a step 116. At the step 116, the count of the counter is incremented by one. As a result, the value of the counter changes to "1". At the next step 117, the count value of the counter is compared with a value "2". Since the count value of the counter is not "2" at this point of time, the flow returns to the step 108 to clear the first timer and, after that, to repeat the steps 110 to 114. When the second change in the output of the third PR 7 is found at the step 110, the flow again proceeds to the step 116 to increment the count value of the counter by one. As a result, the count value of the counter changes to "2". The count value of the counter is compared with the value "2" at the step 117. Since the count value of the counter is "2" this time, the flow proceeds to a step 118. At the step 118, the action of the first timer is brought to a stop. At a step 119, the second timer is caused to start its action. The flow then proceeds to the step 111, and the steps 110 to 114 are again repeatedly executed.

Figure 8:
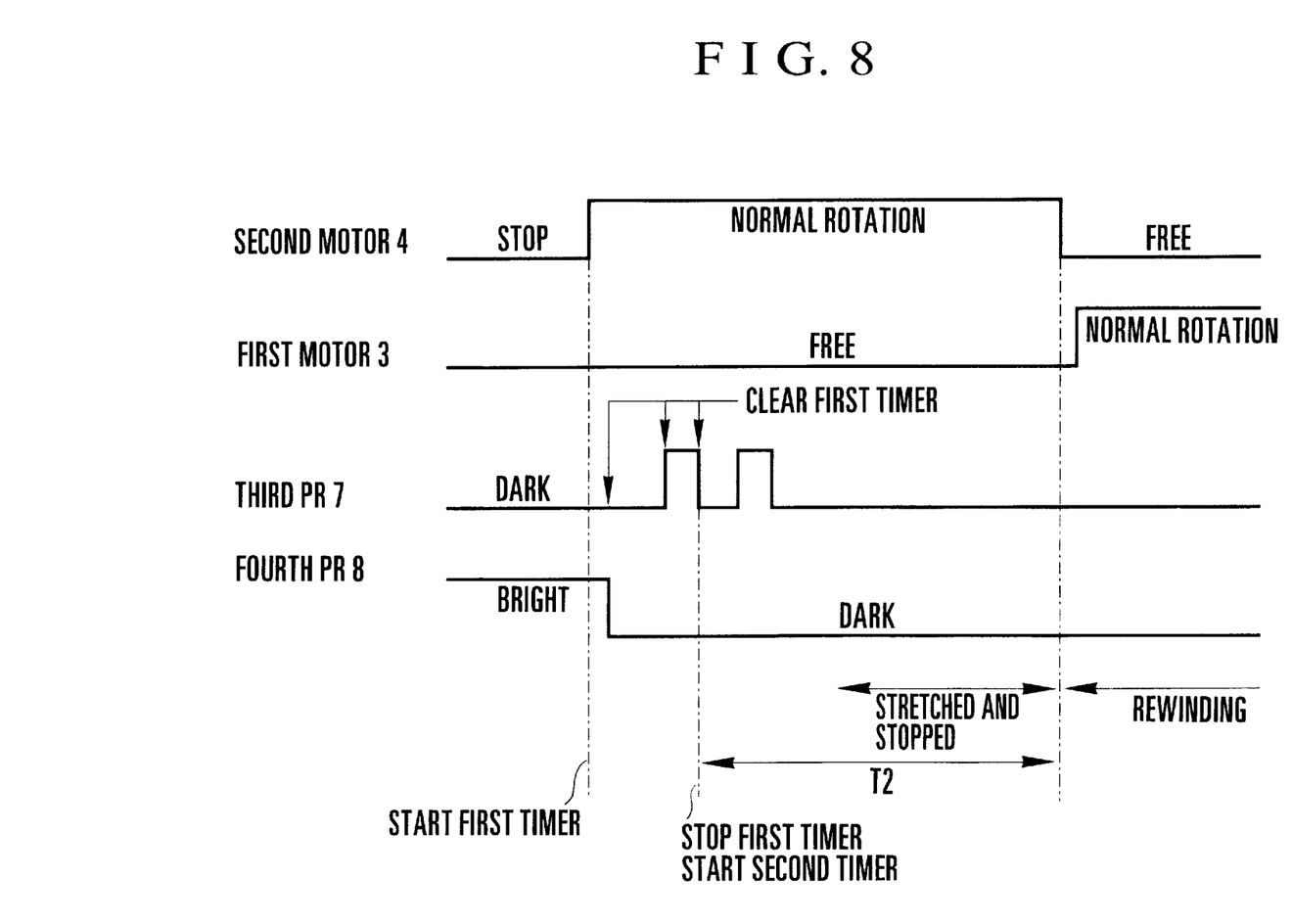
FIG. 8 is a timing chart showing control.

After that, when it becomes impossible to find any changes in the detection outputs of the third and fourth PRs 7 and 8 due to the stretched and stopped state of the film, the second timer comes to overflow with its time count value reaching the second value T2. When this overflow is found at the step 113, the film is judged to be in the stretched and stopped state. The flow then proceeds to the step 127. At the step 127, the motor 4 is set free by stopping it from rotating. The motor 3 is then caused to make a normal rotation for rewinding the film. In this instance, the relation of the state of energizing the motors 3 and 4 in relation to the detection outputs (signals) of the PRs 7 and 8 is as shown in FIG. 8.

Figure 9:
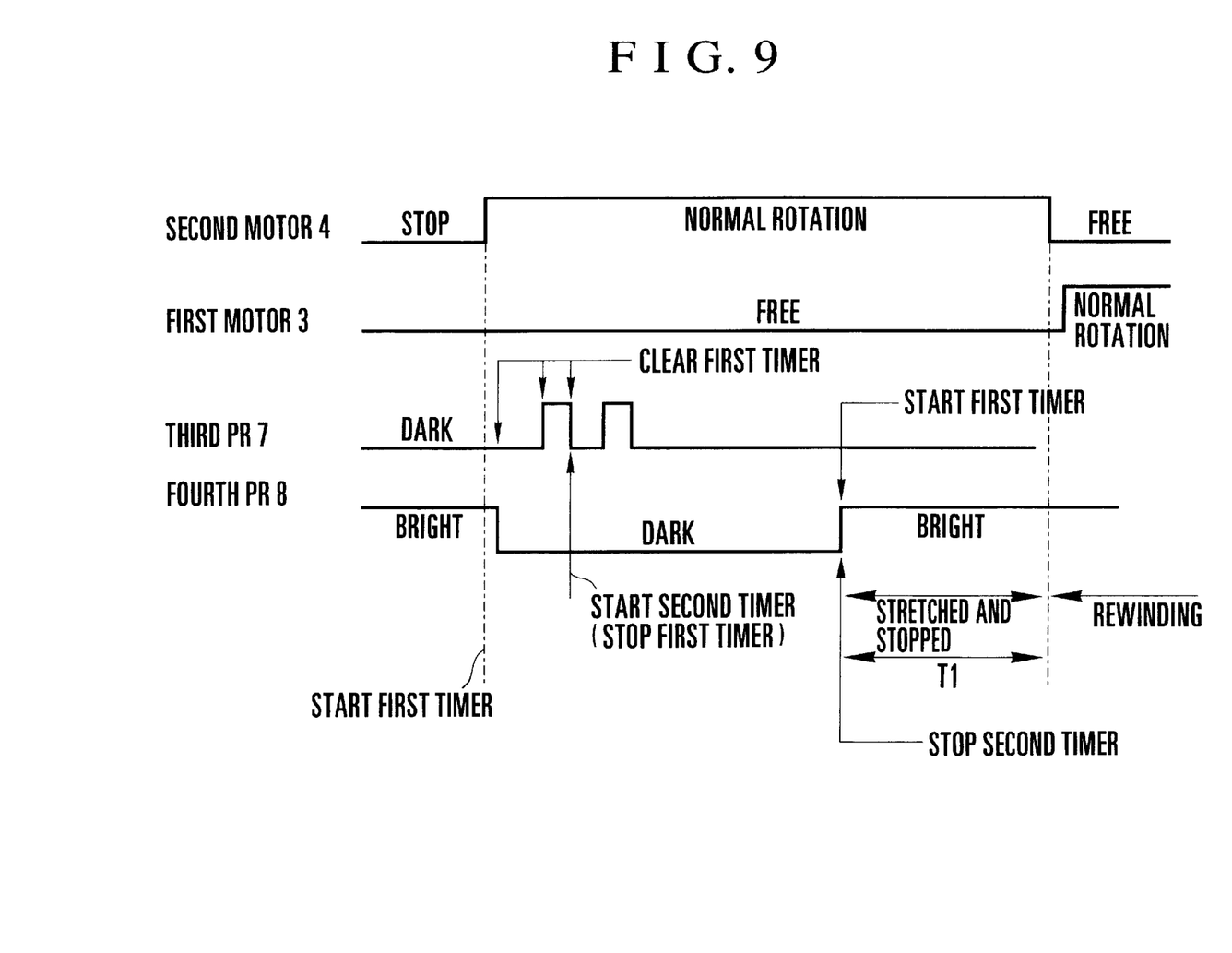
FIG. 9 is a timing chart showing control.

In the subsequent processes, the count value of the counter is incremented by one at the step 116, and then the steps 110 to 114 are repeated, every time the film is moved to cause a change in the detection output of the third PR 7 before the second timer overflows reaching the second value T2. When the detection output of the fourth PR 8 changes, the flow proceeds from the step 111 to a step 120. At the step 120, the count value of the counter is incremented by one. In that instance, assuming that the detection output of the third PR 7 has already changed four times, the count value of the counter changes from "4" to "5". The flow then proceeds to a step 121. At the step 121, the count value of the counter is compared with a value "3". Since the count value of the counter is "5", the flow proceeds to a step 122. At the step 122, the count value of the counter is compared with a value "5". Since the count value of the counter is "5", the flow proceeds to a step 123. At the step 123, a check is made to find if the portion of the film currently wound up to a photographing position is the last frame of the film. The film portion is judged to be the last frame if the number of frames used for photographing coincide with the number of film frames indicated by information recorded on the data disk 209. If so, the flow of operation proceeds to the step 127 for rewinding the film. If not, the flow proceeds to a step 124. At the step 124, the second timer is stopped from acting. At the next step 125, the first timer is caused to start acting. After the step 125, the flow returns to the step 108 to clear the first timer, and then the steps 110 to 114 are repeated. After that, when it becomes no longer possible to find any change in the detection output of the fourth PR 8 due to stretching of the film, the first timer overflows reaching the first value T1. With the overflow found at the step 112, the film is judged to be stretching and the flow proceeds to the step 127 for rewinding the film. The relation of the state of energizing the motors 3 and 4 to the detection outputs (signals) of the PRs 7 and 8 is as shown in FIG. 9.

In the case of the embodiment described, two timers are arranged to be set respectively at the first time value T1 and the second time value T2, because the anticipated changing times of the detection signals (outputs) of the PRs 7 and 8 differ from each other. The value T1 is set to be smaller than the second value T2. The time of continuing the energization of the motor can be shortened to prevent any trouble by virtue of this time setting arrangement when the film comes to stretch. In a case where a burden to the software is to be lessened, the time setting arrangement may be changed to set the same time values at one and the same timer.

Next, in a case where the position of the film reaches its last frame before arriving at the last of the number of photographable frames recorded on the data disk 209 of the film cartridge 101 to cause the PRs 7 and 8 to output detection signals as shown in FIG. 6, the CPU 1 operates as follows.

In this case, after a shot is taken, the flow of operation proceeds to the step 102 to set the first timer to the first value T1. At the step 103, the second timer is set to the second value T2. At the step 104, the second motor 4 which is for film winding is caused to make a normal rotation. At the step 105, the first timer is caused to start its action.

After the commencement of energization of the film-winding second motor 4, when the detection output of the fourth PR 8 is found at the step 106 to have changed from the "bright" state to the "dark" state, the flow of operation proceeds from the step 106 to the step 107. At the step 107, the counter is initialized to "0". At the step 108, the first timer is cleared. At the step 110, a check is made for the change of the detection output of the third PR 7. At the step 111, a check is made for the change of the detection output of the fourth PR 8. If no change is found in both the detection outputs of the third and fourth PRs 7 and 8 at the steps 110 and 111, the flow proceeds to the step 112 to make a check for the overflow of the first timer. At the step 113, a check is made for the overflow of the second timer. If both the first and second timers are found not overflowing at the steps 112 and 113, the flow proceeds to the step 114 to make a check for the count value of the counter. Since the count value of the counter is still "0" at this point of time, the flow returns to the step 110 to repeat the steps 110 to 114. When the film is wound to cause the detection output of the third PR 7 to change during the process of repeating the steps 110 to 114, the CPU 1 operates as follows. With the change in the detection output of the third PR 7 found, the flow proceeds to the step 116 to increment the count value of the counter by one. As a result, the count value of the counter changes to "1". At the step 117, the count value is compared with a value "2". Since the count value is not "2" as yet, the flow returns to the step 108 to clear the first timer and then repeats the steps 110 to 114. When a change in the detection output of the third PR 7 is found for the second time, the flow again proceeds to the step 116 to increment the count value of the counter by one. The count value of the counter then changes to "2". At the step 117, the count value of the counter is compared with the value "2". Then, since the count value of the counter is "2" this time, the flow proceeds to the step 118 to stop the first timer from acting. At the step 119, the second timer is caused to start its action. The flow then repeats the steps 110 to 114.

After that, when the detection output of the fourth PR 8 changes, the flow proceeds from the step 111 to the step 120 to increment the count value of the counter by one. Then, since the detection output of the third PR 7 has already changed twice, the count value changes from "2" to "3". The flow then proceeds to the step 121 to compare the count value of the counter with a value "3". Since the count value of the counter is "3", the flow proceeds to the step 127 to perform the film rewinding action.

Thus, checks for actions can be made in the same manner as in the case of the normal film winding action described in the foregoing.

Next, a flow of operation to be executed in a case where the position of the film fails to reach its last frame even when the number of photographable frames recorded on the data disk 209 of the film cartridge 101 have been used for photographing is described as follows.

After the completion of taking a shot, the flow proceeds to the step 102 to set the first timer to the first value T1. At the step 103, the second timer is set to the second value T2. At the step 104, the second motor 4 is caused to make a normal rotation. At the step 105, the first timer is caused to start its action.

After the commencement of energization of the film-winding second motor 4, when the detection output of the fourth PR 8 is found at the step 106 to have changed from the "bright" state to the "dark" state, the flow of operation proceeds from the step 106 to the step 107. At the step 107, the counter is initialized to "0". At the step 108, the first timer is cleared. At the step 110, a check is made for the change of the detection output of the third PR 7. At the step 111, a check is made for the change of the detection output of the fourth PR 8. If no change is found in both the detection outputs of the third and fourth PRs 7 and 8 at the steps 110 and 111, the flow proceeds to the step 112 to make a check for the overflow of the first timer. At the step 113, a check is made for the overflow of the second timer. If both the first and second timers are found not overflowing at the steps 112 and 113, the flow proceeds to the step 114 to make a check for the count value of the counter. Since the count value of the counter is still "0" at this point of time, the flow returns to the step 110 to repeat the steps 110 to 114.

When the detection output of the third PR 7 changes during the process of repeating the steps 110 to 114, the flow proceeds to the step 116 to increment the count value of the counter by one. As a result, the count value of the counter changes to "1". At the step 117, the count value of the counter is compared with a value "2". Since the count value of the counter is not "2" as yet, the flow returns to the step 108 to clear the first timer and then repeats the steps 110 to 114. When a change in the detection output of the third PR 7 is found for the second time, the flow again proceeds to the step 116 to increment the count value of the counter by one. The count value of the counter then changes to "2". At the step 117, the count value of the counter is compared with the value "2". Then, since the count value of the counter is "2" this time, the flow proceeds to the step 118 to stop the first timer from acting. At the step 119, the second timer is caused to start its action. The flow then repeats the steps 110 to 114.

In the subsequent processes, the count value of the counter is incremented by one at the step 116, and then the steps 110 to 114 are repeated, every time the film is moved to cause a change in the detection output of the third PR 7 before the second timer overflows reaching the second value T2. When the detection output of the fourth PR 8 changes, the flow proceeds from the step 111 to the step 120. At the step 120, the count value of the counter is incremented by one. In that instance, assuming that the detection output of the third PR 7 has already changed four times, the count value of the counter changes from "4" to "5".

The flow then proceeds to the step 121. At the step 121, the count value of the counter is compared with a value "3". Since the count value of the counter is "5", the flow proceeds to the step 122. At the step 122, the count value of the counter is compared with a value "5". Since the count value of the counter is "5", the flow proceeds to the step 123. At the step 123, a check is made to find if the portion of the film currently wound is the last frame of the film. If so, the flow of operation proceeds to the step 127 for rewinding the film. If not, the flow proceeds to the step 124. At the step 124, the second timer is stopped from acting. At the next step 125, the first timer is again caused to start its action. After the step 125, the flow returns to the step 108 to clear the first timer, and then the steps 110 to 114 are repeated.

After that, every time the detection output of the fourth PR 8 changes with the film moved before the first timer reaches the first value T1 and overflows, the flow proceeds to the step 120 to increment the count value of the counter by one and then repeats the steps 110 to 114 again. When the count value of the counter reaches "7", the flow proceeds from the step 114 to a step 128. At the step 128, a check is made to find if the frame portion of the film currently wound up is the last of the number of photographable frames recorded on the data disk 209 of the film cartridge 101. If not, the flow proceeds to a step 115. At the step 115, the film winding action is brought to an end by applying a brake to the film winding motor 4. If so, the flow proceeds to the step 127 to perform the film rewinding action.

As apparent from the foregoing, in the event of occurrence of an abnormal operation, the embodiment is capable of detecting the abnormality leaving the film in a stretched and stopped state, only for a minimal period of time.

The embodiment is arranged by way of example to make the second timer start its action when the detection output of the third PR 7 changes from the "dark" state to the "bright" state and again to the "dark" state. For finer control, however, this arrangement is preferably changed to make the second timer start its action after the next perforation ("bright" state) is detected by the third PR 7. In other words, in the flow chart of FIG. 10, the count value of the counter is compared with a value "4" at the step 117.

In the case of the embodiment described above, the film rewinding action is performed immediately after detection of an abnormality. However, the action to be performed after detection of an abnormality is not limited to the immediate film rewinding action. It is also possible to arrange the camera to show occurrence of an abnormality by simply bringing the film winding action to a stop to inhibit further photographing and to wait for a pushing operation on a film rewinding button (not shown).

In such a case, the film rewinding action proceeds to an end in a normal manner when the film rewinding button is pushed, and the photographing inhibiting state is canceled when the film cartridge is taken out from the camera.

Further, the embodiment described above is preferably arranged such that, when any of the abnormalities of different kinds mentioned in the foregoing is detected, the occurrence of the abnormality is indicated by immediately bringing the film rewinding action or the film winding action to a stop, to inhibit a photographing action thereafter and to wait for a pushing operation on the film rewinding button.

According to the arrangement of the embodiment described above, the occurrence of a stretched and stopped state of the film during the process of film winding can be promptly detected, so that the possibility of troubles due to the continuous driving action of the motor while the film is in the stretched and stopped state can be minimized. Even for a camera of the kind arranged to permit detection of the number of photographable frames, this feature of the embodiment is advantageous particularly in cases where it becomes impossible to accurately count the number of frames wound up for some reasons or where the actual length of the film in use is shorter than a specified length.

Further, the embodiment described above is arranged to forcibly bring the rotation of the film winding motor to a stop and/or to cause the film rewinding means to rewind the film when the film is found to be in the stretched and stopped state. This arrangement enables the operator to make the camera do a next sequence of actions without compelling the operator to do any complex operation. Further, the arrangement for automatically performing the film rewinding action allows the operator to easily know that no further photographing is possible.

Further, the two predetermined periods of time used by a determination means are arranged to be variable according to a difference in distance between adjacent perforations of the film. That arrangement enables the determination means to more quickly find the stretched and stopped state of the film.

Further, since the embodiment described above is arranged to be capable of performing the film winding action even after all the photographable frames are used for photographing, the arrangement permits an optical data imprinting action and/or a magnetic data recording action requiring a film moving action to be carried out for all the frames including the last of them.

I claim:

1. A camera adapted to use a film in which two perforations are respectively formed at both end positions of each picture frame, comprising:
   a winding device which winds the film;
   first and second perforation detecting devices which are respectively disposed adjacent to both end positions of a portion corresponding to a picture plane size; and
   a determination device which, while said winding device is performing a winding action of the film, determines that the film is in a stopped state, if none of the perforations is detected by said second perforation detecting device until the lapse of a first predetermined period of time after one of the perforations has been detected by said first perforation detecting device, and if none of the perforations is detected by said first perforation detecting device until the lapse of a second predetermined period of time after one of the perforations has been detected by said second perforation detecting device.

2. A camera according to claim 1, further comprising a control circuit which forcibly stops the action of said winding device when said determination device determines that the film is in the stopped state.

3. A camera according to claim 1, further comprising a rewinding device which rewinds the film when said determination device determines that the film is in the stopped state.

4. A camera according to claim 1, wherein a detecting part of said first perforation detecting device is disposed on a leading side in a direction in which the film is wound, and wherein the second predetermined period of time is set longer than the first predetermined period of time.

5. A camera according to claim 1, further comprising:
   a reading device which reads number of frames of the film from a recording member provided on a cartridge containing the film therein;
   a counting device which counts number of wound frames of the film; and
   a control circuit which causes said winding device to perform the winding action of the film until said determination device determines that the film is in the stopped state, even after the number of wound frames of the film counted by said counting device has coincided with the number of frames of the film read by said reading device.

6. A camera according to claim 1, wherein each of said first and second perforation detecting devices is composed of an optical-type detecting sensor including a light emitting element.

7. A camera according to claim 1, wherein a microcomputer is provided in said camera, for performing various actions according to a program.

8. A camera according to claim 1, wherein said determination device determines that the film is in the stopped state, if no two perforations which are formed at a narrow interval are detected by said first perforation detecting device or said second perforation detecting device until the lapse of a third predetermined period of time after one of the perforations is detected by said first perforation detecting device or said second perforation detecting device.

9. A camera according to claim 4, wherein said determination device determines that the film is in the stopped state, if no two perforations which are formed at a narrow interval are detected by said first perforation detecting device or said second perforation detecting device until the lapse of a third predetermined period of time after one of the perforations is detected by said first perforation detecting device or said second perforation detecting device.

10. A camera according to claim 9, wherein said first predetermined period of time and said third predetermined period of time are set equal to each other.

11. A camera adapted to use a film in which two perforations are respectively formed at both end positions of each picture frame comprising:
   a winding device which winds the film;
   first and second perforation detecting devices which are respectively disposed adjacent to both end positions of a portion corresponding to a picture plane size; and
   a determination device which, while said winding device is performing a winding action of the film, determines that the film is in a non-proper state, if none of the perforations is detected by said second perforation detecting device until the lapse of a first predetermined period of time after one of the perforations has been detected by said first perforation detecting device, and if none of the perforations is detected by said first perforation detecting device until the lapse of a second predetermined period of time after one of the perforations has been detected by said second perforation detecting device.

12. A camera according to claim 11, further comprising a control circuit which forcibly stops the action of said winding device when said determination device determines that the film is in the non-proper state.

13. A camera according to claim 11, further comprising a rewinding device which rewinds the film when said determination device determines that the film is in the non-proper state.

14. A camera according to claim 11, wherein a detecting part of said first perforation detecting device is disposed on a leading side in a direction in which the film is wound, and wherein the second predetermined period of time is set longer than the first predetermined period of time.

15. A camera according to claim 11, further comprising:
   a reading device which reads number of frames of the film from a recording member provided on a cartridge containing the film therein;
   a counting device which counts number of wound frames of the film; and
   a control circuit which causes said winding device to perform the winding action of the film until said determination device determines that the film is in the non-proper state, even after the number of wound frames of the film counted by said counting device has coincided with the number of frames of the film read by said reading device.

16. A camera according to claim 11, wherein each of said first and second perforation detecting devices is composed of an optical-type detecting sensor including a light emitting element.

17. A camera according to claim 11, wherein a microcomputer is provided in said camera, for performing various actions according to a program.

18. A camera according to claim 11, wherein said determination device determines that the film is in the non-proper state, if no two perforations which are formed at a narrow interval are detected by said first perforation detecting device or said second perforation detecting device until the lapse of a third predetermined period of time after one of the perforations is detected by said first perforation detecting device or said second perforation detecting device.

19. A camera according to claim 14, wherein said determination device determines that the film is in the non-proper state, if no two perforations which are formed at a narrow interval are detected by said first perforation detecting device or said second perforation detecting device until the lapse of a third predetermined period of time after one of the perforations is detected by said first perforation detecting device or said second perforation detecting device.

20. A camera according to claim 19, wherein said first predetermined period of time and said third predetermined period of time are set equal to each other.

* * * * *